INVENTORS
HENRY H. FELDSTEIN
BY HARRY R. KILBY
West & Oldham
ATTORNEYS

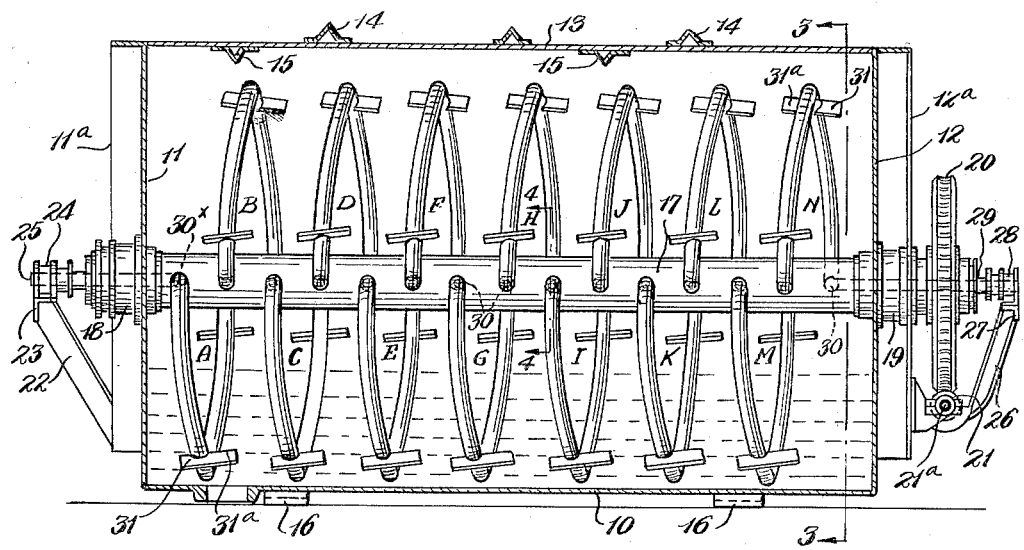
Fig. 1
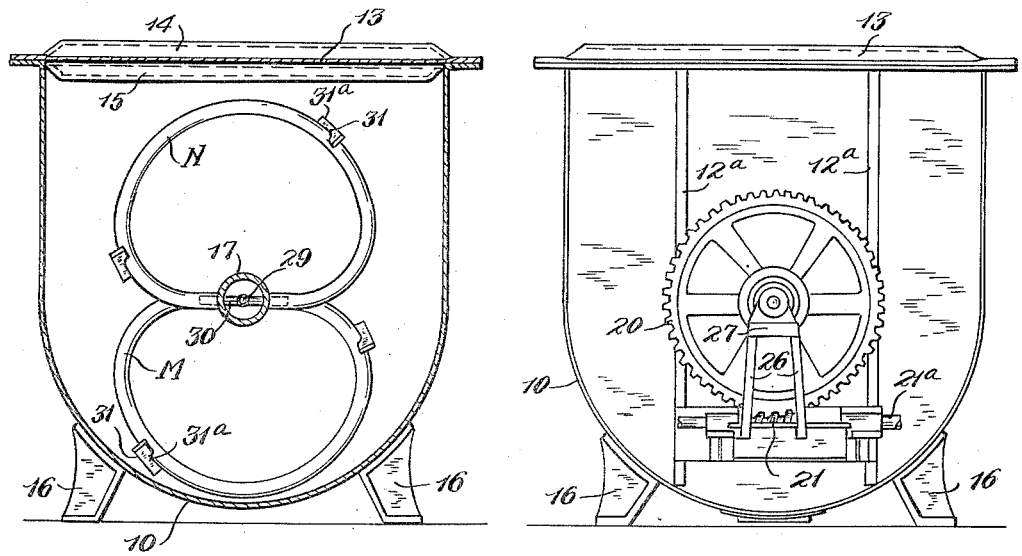
Fig. 3
Fig. 2
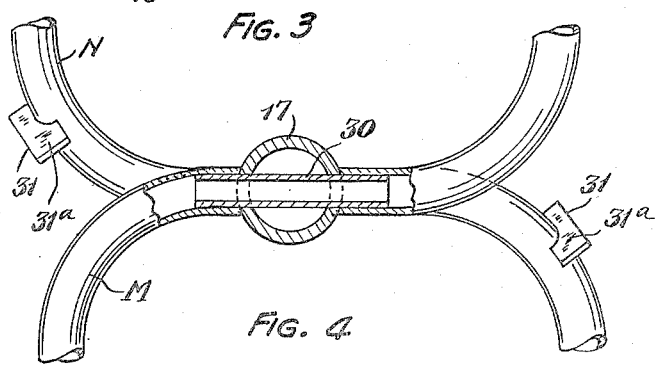
Fig. 4
INVENTORS
HENRY H. FELDSTEIN
BY HARRY R. KILBY
West & Oldham
ATTORNEYS April 22, 1952 — H. H. FELDSTEIN ET AL — 2,594,142
CRYSTALLIZING APPARATUS
Filed July 15, 1947 — 3 Sheets-Sheet 2

INVENTORS
HENRY H. FELDSTEIN
BY HARRY R. KILBY

Weil & Oldham
ATTORNEYS

Patented Apr. 22, 1952

2,594,142

UNITED STATES PATENT OFFICE 2,594,142

CRYSTALLIZING APPARATUS

Henry H. Feldstein, Cleveland, and Harry R. Kilby, East Cleveland, Ohio, assignors, by mesne assignments, to Henry H. Feldstein, Cleveland, Ohio Application July 15, 1947, Serial No. 760,948

3 Claims. (Cl. 127—15)

This invention relates to crystallizing apparatus, such as are employed in the manufacture of sugar or other crystalline substances from massecuite by subjecting the latter to a heat transferring and agitating action produced by the rotation therein of a coil through which a liquid is continuously circulated for heat transfer action.

It is the general purpose and object of the invention to produce a novel construction of a heat transfer coil and a novel manner of mounting the same which will greatly reduce the expense of producing the latter but without sacrificing its efficiency in cooling or heating the massecuite within which it is rotated, and also decreasing the amount of metal rotating with the shaft and causing unnecessary drag on the massecuite.

Another object of the invention is to provide an uncomplicated, efficient heat transfer apparatus which is easily assembled and which can be readily repaired.

As cooling coils have been constructed heretofore, they are constructed upon a shaft which is supported for rotation within the tank containing the massecuite, the opposite ends of the coil being connected with the said shaft and cooling liquid being supplied to the inlet or receiving end of the coil by means of a pipe connection extending axially into one end of the shaft and with which the receiving end of the coil is connected while the delivery end of the coil communicates with an outlet pipe located axially within the opposite end of the shaft. Coils as thus constructed have hitherto required special bracing means secured to the shaft; and, in order to compensate for the additional load carried by the shaft, these bracing means have been given contours such as will enable them to impart longitudinal, and in some cases, radially outward, movement of the massecuite in the tank.

By the construction and manner of mounting the coils on the shafts of the apparatus disclosed herein, we are able to dispense with the use of such bracing means, but without sacrificing either the stability of the coils or the efficiency of the same.

Figure 6:
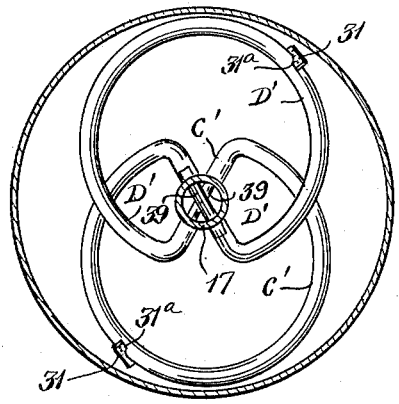
Figure 5:
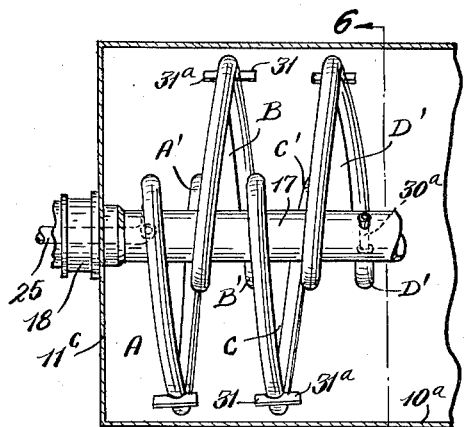
Figure 7:
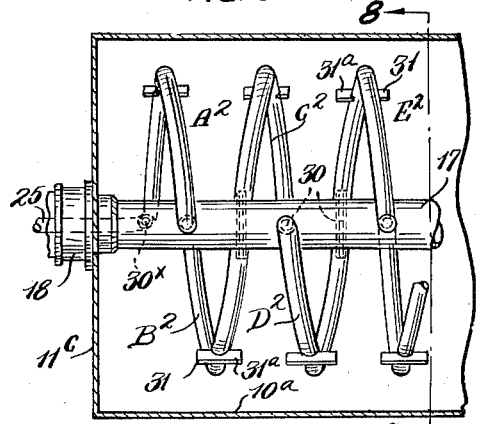
Figure 14:
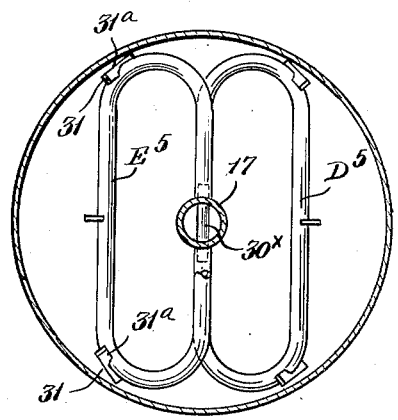

In the drawings hereof, we have shown several forms of apparatus whereby the foregoing objects are obtainable and wherein Fig. 1 represents a longitudinal sectional view through a tank having therein a coil constructed and supported in accordance with our invention, the coil and the shaft being shown in elevation; Fig. 2 an end elevational view of the apparatus shown in Fig. 1; Figs. 3 and 4 are details in section corresponding respectively to the lines 3—3 and 4—4 of Fig. 1 and looking in the direction of the arrows; Fig. 5 a sectional view of one end of a tank, showing in elevation, within the tank, a portion of the shaft and a portion of a modified form of our coil, the latter being supported by the shaft; Fig. 6 a detail in section corresponding to the line 6—6 of Fig. 5 and looking in the direction of the arrows; Fig. 7 a view, similar to Fig. 5, of a further modification of our invention and Fig. 8 a detail in section taken on the line 8—8 of Fig. 7 and looking in the direction of the arrow; Fig. 9 a view similar to Figs. 5 and 7 and showing a still further modification of our invention and Fig. 10 a detail in section taken on the line 10—10 of Fig. 9 and looking in the direction of the arrows; Fig. 11 a view similar to Figs. 5, 7 and 9 showing a still further modification of our invention and Fig. 12 a detail in section taken on the line 12—12 of Fig. 11 and looking in the direction of the arrows; Fig. 13 a view similar to Figs. 5, 7, 9 and 11 showing a still further modification of our invention; Fig. 14 a detail in section taken on the line 14—14 of Fig. 13 and looking in the direction of the arrows; and Figs. 15, 16 and 17 fragmentary sections showing details of modified constructions for connecting coils to tubular or solid supporting shafts.

Describing the parts by reference characters, and first in connection with Figs. 1-4 inclusive, 10 denotes a tank which, as shown in Figs. 2 and 3, is of generally U shape in section. The tank is provided with heads 11 and 12, each having vertical braces 11a and 12a secured thereto, the latter braces being shown particularly in Fig. 2. The tank is also provided with a cover 13, the said cover being provided with reinforcing braces 14 on the upper surface thereof and with angle-iron braces 15 secured to the lower surface thereof. The tank will be provided with the usual means (not shown) for introducing massecuite thereinto and for removing the concentrate therefrom and is shown as supported by cradle brackets 16.

17 denotes a shaft extending longitudinally and substantially centrally through the tank and having its opposite ends mounted in journals 18 and 19 carried by the heads 11 and 12 respectively. One end of the shaft has a worm gear 20 secured thereto, the said gear being driven by a worm 21 on a worm shaft 21a. 22 denotes one of a pair of braces extending upwardly from the lower portion of the head 11 and supporting at their upper ends a bracket 23 to which there is secured a bearing 24 for a portion of the inlet pipe or conduit 25 which extends axially into the adjacent end of the shaft 17. 26 denotes braces, similar to the braces 22, which extend upwardly from the housing for the worm 21 and which support at their upper ends a bracket 27 to which there is secured a bearing 28 for the outlet pipe section or conduit 29, which is arranged axially within the portion of the shaft 17 which extends through the head 12.

As shown herein, the shaft 17 is hollow, and the delivery end of the pipe section or conduit 25 communicates with the receiving end of the first coil section A of a series of said sections by means of a pipe section or passage $30^x$ extending from the center of the shaft 17 to the exterior thereof, each of which sections extends in the same direction from the shaft. The coil section A is substantially heart-shaped in contour and has its opposite ends connected to the shaft (in a manner to be described) and is given a spiral form with the major circular portion of said section extending in proximity to the inner wall of the tank during more than half of each revolution of the shaft. The delivery end of section A of the first series is connected to one end of a passage, shown as a pipe section 30, which extends across the shaft 17, and to the opposite end of this pipe section the receiving end of the first section B of another series of coil sections is connected, the centers of the circular portion of this section being circumferentially, and preferably diametrically, spaced from the center of the circular portion of coil section A and being of the same shape as section A and having its delivery end connected to one end of a transverse passage, such as the pipe section 30, extending transversely of the shaft 17 and to the opposite end of which pipe section the receiving end of section C of the first series is connected. This manner of connecting the delivery end of one coil section of one series with the receiving end of the next succeeding coil section of the other series is employed throughout the coil, including the sections D, F, H, J, L and N of the first series and the sections E, G, I, K and M of the other series. The delivery end of the coil section N is connected with the outlet pipe or conduit 29.

Each coil section has a combined stirring and scraping element secured thereto so that its outer portion 31 will be in close proximity to the inner wall of the tank during more than one-half of each revolution of the shaft, while the surface $31^a$ thereof is inclined with respect to a plane including the axis of the shaft, whereby its movement through the massecuite will impart peripheral movement to the latter as well as longitudinal movement thereto from the head 11 toward the head 12. The radius of the circular part of each coil section is not as long as the radius which extends from the axis of the shaft to the cylindrical portion of the wall 10, and the portion of the coil section to which the combined stirrer and scraper is attached is at a shorter distance from the axis of the shaft than is the central portion of the said section. Hence the outer portion of the combined stirrer and scraper will not score the inner wall of the tank.

Due to the manner in which the sections of the coil are supported by the shaft, the use of bracing arms secured to the shaft and to the coil sections is entirely eliminated, with a corresponding reduction in expense of production and also in the power required to rotate the shaft and the coil sections.

The construction also provides for a continuous flow of cooling liquid through the complete coil, whereby a high coefficient of heat transfer from the water in the coil to the massecuite is secured and whereby any air that may happen to be present in one or more of the coil sections is swept to the outlet pipe section 29 by the continuously flowing cooling liquid and the presence of air pockets in the coil is prevented, which would correspondingly decrease the efficiency of the coil in its cooling action.

While the shaft 17 is shown herein as hollow, it may, of course, be solid, in which case the pipe sections 30 will be mounted in bores extending transversely through the said shaft; or the ends of the coil sections may be connected to opposite ends of bores extending through the shaft. Where the tank is of the shape shown in Figs. 2 and 3, the portions 31 of the combined stirrer and scraper elements will be in close proximity to the inner wall of the tank for over one-half of each revolution of the shaft. Where the tank is circular, these portions will pass in close proximity to the entire inner wall of the tank.

The coil sections of one series form jointly with the coil sections of the other series a complete coil which, in effect, is wound spirally about the shaft, the convolutions of the spiral being inclined away from the head 11 and toward the head 12.

In Figs. 5 and 6 there is shown a modification of the shape of the wall of the tank and of the coil sections, the wall $10^a$ of the tank being cylindrical and the heads thereof being circular, the head at the front or receiving end of the shaft 17 being indicated at $11^c$, the opposite head (not shown) being also circular. The manner of supporting the tank and the manner of supporting and rotating the shaft are identical in this modification, as well as in the modifications shown in the succeeding views, with the manner of supporting the tank and the manner of rotating the shaft as disclosed in Figs. 1 and 2, and additional illustration thereof in the modifications is unnecessary, it being noted that the scale employed in illustrating the various forms of our invention is identical in all such forms.

In Figs. 5 and 6, each coil section A, B, C, D, etc. is approximately heart-shaped in contour, the central circular portion of each section, which is remote from the axis of the shaft, being in close proximity to the inner wall of the tank, but the end portions of each section extend beyond the shaft before being united thereto, as indicated at $A^1$, $B^1$, $C^1$, and $D^1$, whereby the cooling surfaces of these coil sections are greater in extent than is the case with the cooling surfaces of the coil sections in Figs. 1 and 2. The ends of each coil sections of one series are connected with the ends of the adjacent coil sections of the coil sections of the other series by means of inclined pipe sections 39 extending through the shaft 17 and each coil section is provided with the combined stirrer and scraper 31, $31^a$.

Figure 8:
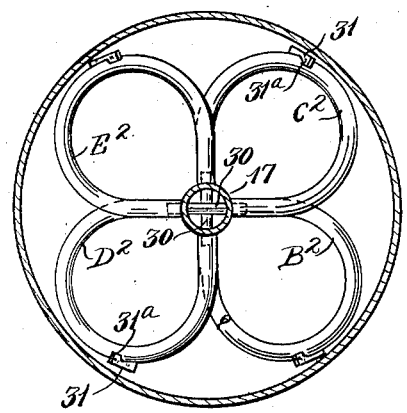
Figure 9:
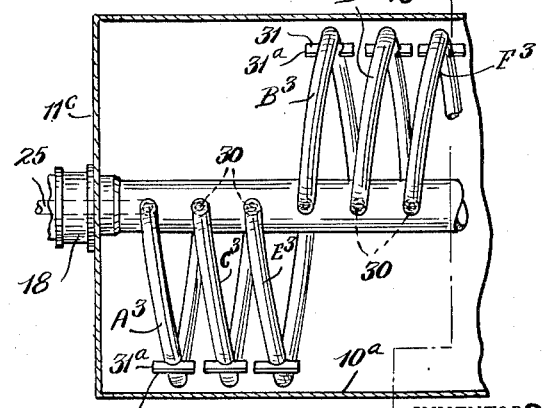

In Figs. 7 and 8, the delivery end of the first coil section $A^2$ of one series is connected to the receiving end of the next coil section $B^2$ of the other series by pipe sections 30 extending through the shaft 17 and both ends of the succeeding coil sections in each series are connected with both ends of the coil sections in the other series by like pipe sections 30 extending through the shaft 17 and serving to effect such connection. The receiving end of coil section A² is supplied by pipe 25 through the passage or pipe section 30ˣ extending from the center of the shaft to the exterior thereof. The coil sections comprise each an intermediate outer portion, of circular contour in elevation, with the center of such circular portion in close proximity to the inner wall of the tank and with the ends of the said portion connected to the appropriate pipe section 30 by substantially straight radially extending inner end portions, as will be evident from an inspection of Fig. 8. This construction and arrangement of coil sections provides a large contact area between the coil sections and the massecuite. Each section is provided with the combined stirrer and scraper 31, 31ª.

Figure 10:
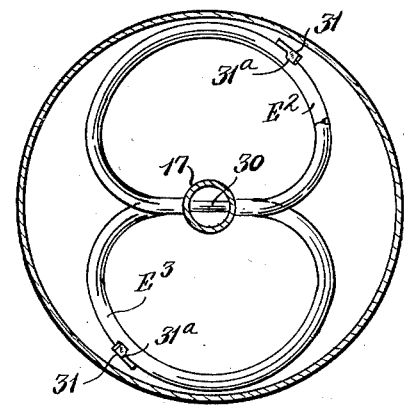
Figure 11:
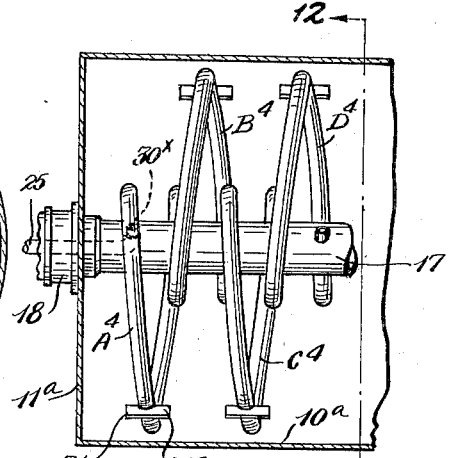

In Figs. 9 and 10, the tank is cylindrical and the coil sections are of substantially the same contour as are the coil sections in Figs. 1 and 2. However, the coil sections of one series do not alternate with those of the other series, but each series is composed of a group of coil sections, the coil sections in a group included in one series projecting in a diametrically opposite direction from the shaft than do the coil sections in a group included in the other series. The inner ends of the coil sections A³, C³ and E³ of a group in one series are connected, by pipe sections 30 extending through the shaft 17, the delivery end of section E³ being connected with the receiving end of the first coil section of the group B³, D³ and F³ of the other series by a like pipe section 30. The coil sections B³, D³ and F³ are connected by like pipe sections 30. The receiving end of coil section A³ is supplied by pipe section 25 through the passage or pipe section 30ˣ extending from the center of the shaft to the exterior thereof. The number of coil sections in each group over the number of opposed groups of coil sections may be varied as desired, it being understood that the centers of the circular portions of the coil sections in the group or groups of one series will be diametrically opposed to the centers of the circular portions of the coil sections in the group or groups of the other series. Each coil section is provided with a combined stirrer and scraper 31, 31ª.

Figure 12:
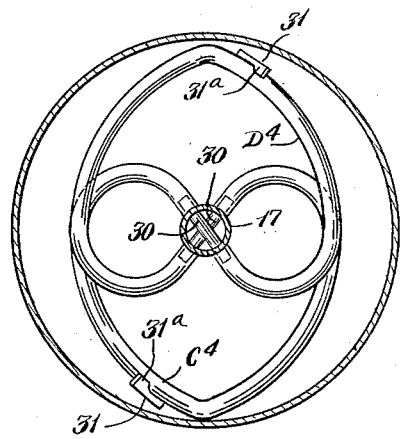
Figure 13:
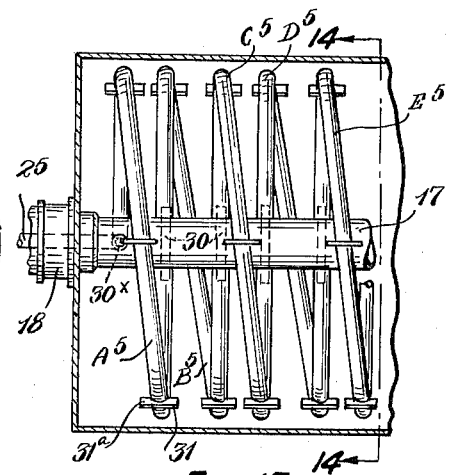

In Figs. 11 and 12, the tank is shown as cylindrical and each coil section is of pointed heart-shaped contour with its inboard ends substantially semi-circular in contour. The delivery end of the first section A⁴ of one series is connected by a pipe section, such as 30, extending through the shaft 17, with the receiving end of the adjacent section B⁴ of the other series and the delivery end of B⁴ is connected in turn by a like pipe section 30 with the receiving end of section C⁴ of the first series, and so on, the coil sections of one series being diametrically opposed to the coil sections of the other series. The receiving end of coil section A⁴ is supplied by pipe 25 through the passage or pipe section 30ˣ extending from the center of the shaft to the exterior thereof. Each coil section is provided with a combined stirrer and scraper 31, 31ª.

In Figs. 13 and 14, the tank is shown as cylindrical and the coil sections approximate each in contour an ellipse the outer semi-circular ends of which are in proximity to the inner wall of the tank, the coil sections of one series being diametrically opposed to the coil sections in the other series.

It will be seen that the receiving end of coil section A⁵ of one series is connected, as by a pipe section or passage 30ˣ, extending from the center to the exterior of the shaft 17, with the inlet pipe 25 and that its delivery end is connected by a vertical pipe section 30 with the receiving end of the adjacent coil section B⁵ of the other series. The alternating coil sections in the two series are connected in like manner. The combined stirrer and scraper 31, 31ª is connected to the outer curved ends of each coil section.

Figure 15:
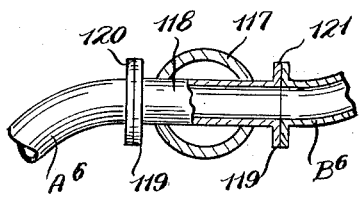
Figure 16:
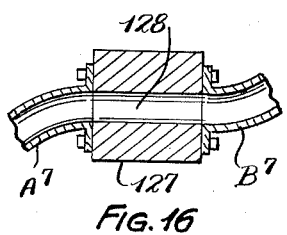
Figure 17:
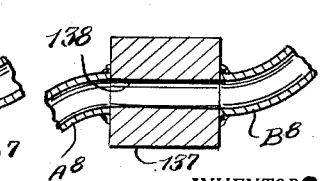

Figs. 15 through 17 show alternate methods of securing the coils to the support shaft with Fig. 15 having a tubular shaft 117 that supports coils A⁶ and B⁶ by a short pipe 118. The pipe 118 has end flanges 119 which abut against similar flanges 120 and 121 formed at the ends of coils A⁶ and B⁶, respectively, and are suitably secured thereto. In Fig. 16, coils A⁷ and B⁷ have flanged ends that are secured in any desired manner to a solid shaft 127, which has a transversely directed bore 128 formed therein, in register with the bore 128. Fig. 17 shows coil ends A⁸ and B⁸ that are directly welded to a solid shaft 137 in register with a bore 138 formed therein. In all of these constructions, the heat transfer medium will flow from one coil to the next coil through the supporting shaft for the coils in a closed flow circuit.

While the various coils embodying the invention have been referred to throughout the specification as cooling coils, they may be used as heating coils in some instances since the massecuite may be heated slightly before being passed to a centrifuge for separation of the crystals from the residual liquor without any loss of separated crystals. However, the apparatus can be used for any desired heat transfer action in any field.

Several embodiments of the invention have been described herein in detail but it will be understood that modification thereof may be made within the scope of the appended claims. The pipe sections 30 used to connect the adjacent ends of connecting coils form fluid tight couplings and may, for example, be welded or soldered to the supporting shaft and the coils, or the coils may be secured, as by a welded, soldered or brazed joint directly to the support shaft so as to be rigidly secured thereto.

Reference is hereby made to our co-pending application No. 71,986, filed January 21, 1949, now Patent Number 2,540,250.

Having thus described our invention, what we claim is:

1. In heat transfer apparatus, a driven hollow support shaft having a bore, a plurality of coil sections of similar shape associated at their ends with and supported by said shaft, a tank in which said shaft is positioned with said coil section being received within said tank, each of said coil sections being axially inclined with relation to said shaft and being provided with an inlet and an outlet end, the end portions of said coils extending substantially radially with relation to said shaft and the end portions of any one coil being spaced axially of said shaft with relation to each other, and a pipe section extending substantially diametrically through said shaft and the bore thereof and connecting the outlet end of one of said coil sections to the inlet end of said next coil section, the bore of said support shaft being only partially filled by said pipe section.

2. In heat transfer apparatus as in claim 1, said support shaft having a hole formed in the walls thereof extending substantially diametrically therethrough, and said pipe section being received in and positioned by said hole in said shaft and extending through the bore of said shaft.

3. A crystallizing apparatus comprising, in combination, a tank having heads and a wall which connects said heads and a portion at least of which wall is cylindrical in form, a shaft extending longitudinally of and within said tank, and means for rotating said shaft, an assembly of symmetrical coil sections arranged in a plurality of series, the coil sections of each series being circumferentially and equidistantly axially spaced from the coil sections of an adjacent series and each coil section of one of said series having its opposite ends secured to axially spaced portions of the shaft and projecting radially and laterally outwardly from its points of connection with said shaft with a portion thereof which is most remote from the shaft in proximity to the cylindrical portion of the wall of said tank, each coil section of said series extending spirally from one end to the other end thereof and each of the coil sections of the other series having its opposite ends connected with the shaft and projecting radially and laterally outwardly from its points of connection with said shaft and each extending spirally from one end to the other end thereof, there being a plurality of passage means extending directly through the shaft and to the opposite ends of each of which the delivery end of a coil section and the receiving end of the next succeeding coil section are respectively connected, and means for supplying heat transfer liquid to the receiving end of the first coil section and thence successively through the passage means and the coil sections connected respectively thereto throughout the said assembly, said passage means in said shaft each comprising an end flanged unitary pipe section extending through a bore formed in said shaft and connected at each end to a flanged end of a coil section, said pipe sections being positioned by and in holes extending through said shaft.

HENRY H. FELDSTEIN.
HARRY R. KILBY.

REFERENCES CITED

The following references are of record in the file of this patent:

UNITED STATES PATENTS

| Number | Name | Date |
|---|---|---|
| 615,329 | Whitteley | Dec. 6, 1898 |
| 736,875 | Ragot | Aug. 18, 1903 |
| 1,156,851 | Pfouts | Oct. 12, 1915 |
| 1,934,787 | Bjorklund | Nov. 14, 1933 |
| 2,097,208 | Grill et al. | Oct. 26, 1937 |
| 2,153,082 | Grill et al. | Apr. 4, 1939 |
| 2,206,237 | Roberts | July 2, 1940 |
| 2,458,440 | Stafford | Jan. 4, 1949 |

FOREIGN PATENTS

| Number | Country | Date |
|---|---|---|
| 469,771 | Great Britain | Aug. 3, 1937 |
| 35,237 | Germany | Sept. 8, 1885 |